(12) United States Patent
Forehand

(10) Patent No.: US 11,256,799 B2
(45) Date of Patent: Feb. 22, 2022

(54) DEVICE LIFECYCLE DISTRIBUTED LEDGER

(71) Applicant: Seagate Technology LLC, Cupertino, CA (US)

(72) Inventor: Monty Aaron Forehand, Loveland, CO (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 59 days.

(21) Appl. No.: 15/689,235

(22) Filed: Aug. 29, 2017

(65) Prior Publication Data
US 2019/0065733 A1   Feb. 28, 2019

(51) Int. Cl.
| | |
|---|---|
| G06F 21/44 | (2013.01) |
| G06F 21/60 | (2013.01) |
| H04L 29/06 | (2006.01) |
| H04L 9/08 | (2006.01) |
| G06Q 30/06 | (2012.01) |
| H04L 9/32 | (2006.01) |
| G06Q 30/02 | (2012.01) |
| G06Q 10/08 | (2012.01) |
| G06F 21/57 | (2013.01) |

(52) U.S. Cl.
CPC ............ *G06F 21/445* (2013.01); *G06F 21/57* (2013.01); *G06F 21/602* (2013.01); *G06Q 10/08* (2013.01); *G06Q 30/02* (2013.01); *G06Q 30/06* (2013.01); *H04L 9/08* (2013.01); *H04L 9/32* (2013.01); *H04L 9/3239* (2013.01); *H04L 9/3247* (2013.01); *H04L 9/3263* (2013.01); *H04L 63/062* (2013.01); *G06Q 2220/00* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 7,765,217 B2 | 7/2010 | Yamakawa |
| 8,099,365 B2 | 1/2012 | Bhambri |
| 8,108,923 B1 | 1/2012 | Satish |
| 8,161,527 B2 | 4/2012 | Curren |
| 8,516,552 B2 | 8/2013 | Raleigh |
| 8,788,810 B2 | 1/2014 | Zhang |
| 8,843,997 B1 | 9/2014 | Hare |

(Continued)

OTHER PUBLICATIONS

No stated author; Hitachi Command Suite Audit Log Reference Guide; 2014; Retrieved from the Internet <URL: https://support.hitachivantara.com/download/epcra/hc2132.pdf>; pp. 1-480, as printed (Year: 2014).*

(Continued)

*Primary Examiner* — Michael W Chao
(74) *Attorney, Agent, or Firm* — Holzer Patel Drennan

(57) ABSTRACT

A distributed ledger is used by one or more parties executing a ledger node to document a lifecycle of a device. When devices are manufactured, shipped, and used, attestation transactions are recorded to the distributed ledger that identify the devices and include attestation information about the device. The distributed ledger further supports command transactions that are used to change the behavior of the device, such as unlocking capabilities on the device. The distributed ledger provides a history of device attestation and activation.

17 Claims, 8 Drawing Sheets

(56) References Cited

U.S. PATENT DOCUMENTS

| | | | |
|---|---|---|---|
| 8,984,293 B2 | 3/2015 | Layson | |
| 9,182,944 B2* | 11/2015 | Du | G06F 8/10 |
| 9,373,219 B2 | 6/2016 | Bigelow, Jr. | |
| 9,424,023 B2* | 8/2016 | Jansson | G06F 13/4081 |
| 9,858,781 B1* | 1/2018 | Campero | G06F 9/451 |
| 9,960,920 B2 | 5/2018 | Cuende et al. | |
| 10,291,395 B1 | 5/2019 | Nenov et al. | |
| 10,320,566 B2* | 6/2019 | Banerjee | H04L 9/32 |
| 10,326,749 B2* | 6/2019 | Linton | H04L 63/08 |
| 10,333,705 B2* | 6/2019 | Smith | H04L 9/0861 |
| 10,361,869 B2* | 7/2019 | Gorman | H04L 9/3247 |
| 10,367,645 B2* | 7/2019 | Dechu | H04L 9/3239 |
| 10,489,597 B2* | 11/2019 | Safford | H04L 63/06 |
| 10,581,847 B1* | 3/2020 | Sun | H04L 9/3239 |
| 10,754,323 B2* | 8/2020 | Freer | B33Y 50/00 |
| 10,755,230 B2* | 8/2020 | Mehring | H04L 9/3239 |
| 10,855,758 B1* | 12/2020 | O'Connell | H04L 9/3297 |
| 10,972,282 B2* | 4/2021 | Banerjee | H04L 9/3263 |
| 11,012,228 B2* | 5/2021 | Mercuri | G06F 11/3476 |
| 11,037,082 B2* | 6/2021 | Scott | G06Q 10/0633 |
| 11,050,605 B2* | 6/2021 | Gulati | G09C 1/00 |
| 11,074,766 B2* | 7/2021 | Dietz | G07C 5/00 |
| 11,128,528 B2* | 9/2021 | Nolan | H04L 67/1046 |
| 11,128,607 B2* | 9/2021 | Wright | H04L 9/085 |
| 2006/0095923 A1* | 5/2006 | Novack | G06Q 20/401 719/318 |
| 2010/0293345 A1 | 11/2010 | Sonnier et al. | |
| 2013/0291001 A1 | 10/2013 | Besehanic et al. | |
| 2015/0186760 A1* | 7/2015 | Albrecht | H04N 1/00334 358/498 |
| 2016/0098723 A1* | 4/2016 | Feeney | G06Q 20/065 705/75 |
| 2016/0098730 A1 | 4/2016 | Feeney | |
| 2016/0275461 A1* | 9/2016 | Sprague | G06Q 20/0655 |
| 2016/0299918 A1* | 10/2016 | Ford | G06F 21/645 |
| 2016/0344550 A1 | 11/2016 | Anton | |
| 2016/0379212 A1* | 12/2016 | Bowman | G06Q 20/38215 705/71 |
| 2017/0005804 A1 | 1/2017 | Zinder | |
| 2017/0031676 A1 | 2/2017 | Cecchetti | |
| 2017/0134161 A1 | 5/2017 | Goeringer et al. | |
| 2017/0134162 A1 | 5/2017 | Code et al. | |
| 2017/0262862 A1* | 9/2017 | Aljawhari | G06F 16/90335 |
| 2017/0264428 A1* | 9/2017 | Seger, II | H04L 9/0637 |
| 2017/0352027 A1* | 12/2017 | Zhang | H04L 9/0825 |
| 2018/0019867 A1 | 1/2018 | Davis | |
| 2018/0121635 A1 | 5/2018 | Tormasov | |
| 2018/0131765 A1 | 5/2018 | Puleston et al. | |
| 2018/0157825 A1 | 6/2018 | Eksten | |
| 2018/0176228 A1* | 6/2018 | He | H04L 63/105 |
| 2018/0191714 A1* | 7/2018 | Jentzsch | H04L 63/101 |
| 2018/0198604 A1* | 7/2018 | Hayton | H04L 9/088 |
| 2018/0219676 A1* | 8/2018 | Mattingly | H04L 9/3239 |
| 2018/0248701 A1* | 8/2018 | Johnson | H04L 9/3247 |
| 2018/0260212 A1 | 9/2018 | Wisnovsky | |
| 2018/0268386 A1* | 9/2018 | Wack | G06Q 20/102 |
| 2018/0285839 A1 | 10/2018 | Yang | |
| 2018/0287797 A1* | 10/2018 | Banerjee | H04L 9/3239 |
| 2018/0375750 A1* | 12/2018 | Moeller | G06F 16/27 |
| 2019/0066068 A1 | 2/2019 | Mitchell | |
| 2019/0114334 A1* | 4/2019 | Gunther | H04L 9/0643 |
| 2019/0158291 A1* | 5/2019 | Ignatchenko | H04L 9/3234 |
| 2019/0158470 A1* | 5/2019 | Wright | H04W 4/70 |
| 2019/0166132 A1* | 5/2019 | He | H04L 63/105 |
| 2019/0182053 A1* | 6/2019 | Varpiola | G06Q 50/184 |
| 2019/0207957 A1 | 7/2019 | Espinosa | |
| 2019/0245694 A1* | 8/2019 | Banerjee | H04L 9/3239 |
| 2019/0319808 A1* | 10/2019 | Fallah | H04L 9/30 |
| 2019/0333059 A1* | 10/2019 | Fallah | H04L 9/3239 |
| 2019/0349733 A1* | 11/2019 | Nolan | H04L 41/0806 |
| 2019/0372755 A1 | 12/2019 | Tadie | |
| 2019/0372772 A1 | 12/2019 | Novotny et al. | |
| 2021/0126826 A1* | 4/2021 | Nolan | H04L 41/12 |
| 2021/0185140 A1* | 6/2021 | Mild | H04L 63/083 |
| 2021/0192650 A1* | 6/2021 | Hunn | G06F 16/904 |
| 2021/0224358 A1* | 7/2021 | Lattin | H04L 9/0877 |
| 2021/0258150 A1* | 8/2021 | Moeller | H04L 9/3239 |

OTHER PUBLICATIONS

Abeyratne et al.; Blockchain Ready Manufacturing Supply Chain Using Distributed Ledger; 2016; retrieved from the Internet https://www.researchgate.net/profile/Radmehr_Monfared; pp. 1-12, as printed. (Year: 2016).*

No stated author; MAXXeGUARD Shredder; 2016; retrieved from the Internet https://dtasiagroup.com/maxxeguard-the-high-security-shredder/; pp. 1-6, as printed. (Year: 2016).*

No stated author; GoShredConfidential, Hard Drive / Data Destruction; May 2017; retrieved from web.archive, www.goshredconfidential.com/hard-drive-data-destruction/; pp. 1-4 as printed. (Year: 2017).*

No stated author; Guardian Data Destruction; Apr. 2017; retrieved from web.archive, www.guardiandatadestruction.com/; pp. 1-16 as printed. (Year: 2017).*

No stated author; Synetic technologies, On-site Data Destruction; Mar. 2016; retrieved from web.archive, https://synetictechnologies.com/solutions/ddv/; pp. 1-4, as printed. (Year: 2016).*

Author Unknown, "Implement your first IoT and Blockchain project," IBM, [retrieved on Aug. 22, 2017] 6 pages, retrieved from: https://www.ibm.com/internet-of-things/platform/private-blockchain/.

O'Connor, Chris, "What blockchain means for you, and the Internet of Things," IBM, Feb. 10, 2017, [retrieved on Aug. 22, 2017] 9 pages, retrieved from: https://www.ibm.com/blogs/internet-of-things/watson-iot-blockchain/.

Reichert, Corrine, "Telstra explores blockchain, biometrics to secure smart home IoT devices," ZDNe,t Sep. 22, 2016 [retrieved on Aug. 22, 2017] 11 pages, retrieved from: http://www.zdnet.com/article/telstra-explores-blockchain-biometrics-to-secure-smart-home-iot-devices/.

* cited by examiner

DEVICE LIFECYCLE DISTRIBUTED LEDGER

BACKGROUND

After devices leave a manufacturing facility, it is difficult to confirm devices' authenticity and integrity. Because devices are increasingly implemented with functionality for network connectivity, performing computations, controlling other device, device security and authenticity is increasingly important. If a device is believed to be faulty or compromised (e.g., via malware), then the device may be returned to a device manufacturer. Returning a device to a manufacturer may be costly and time consuming. Furthermore, devices under warranty may be analyzed under a return merchandise authorization (RMA) process. It is often difficult for a device manufacturer to confirm that the device warranty has not been voided.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, a method includes generating attestation information associated with a storage device. The attestation information represents a status of the storage device. The method further includes transmitting an attestation transaction to a distributed ledger. The attestation transaction including the attestation information representing the status of the storage device. The attestation transaction provides a record of the status of the storage device accessible through the distributed ledger These and various other features and advantages will be apparent from a reading of the following Detailed Description.

DETAILED DESCRIPTION

Figure 1:
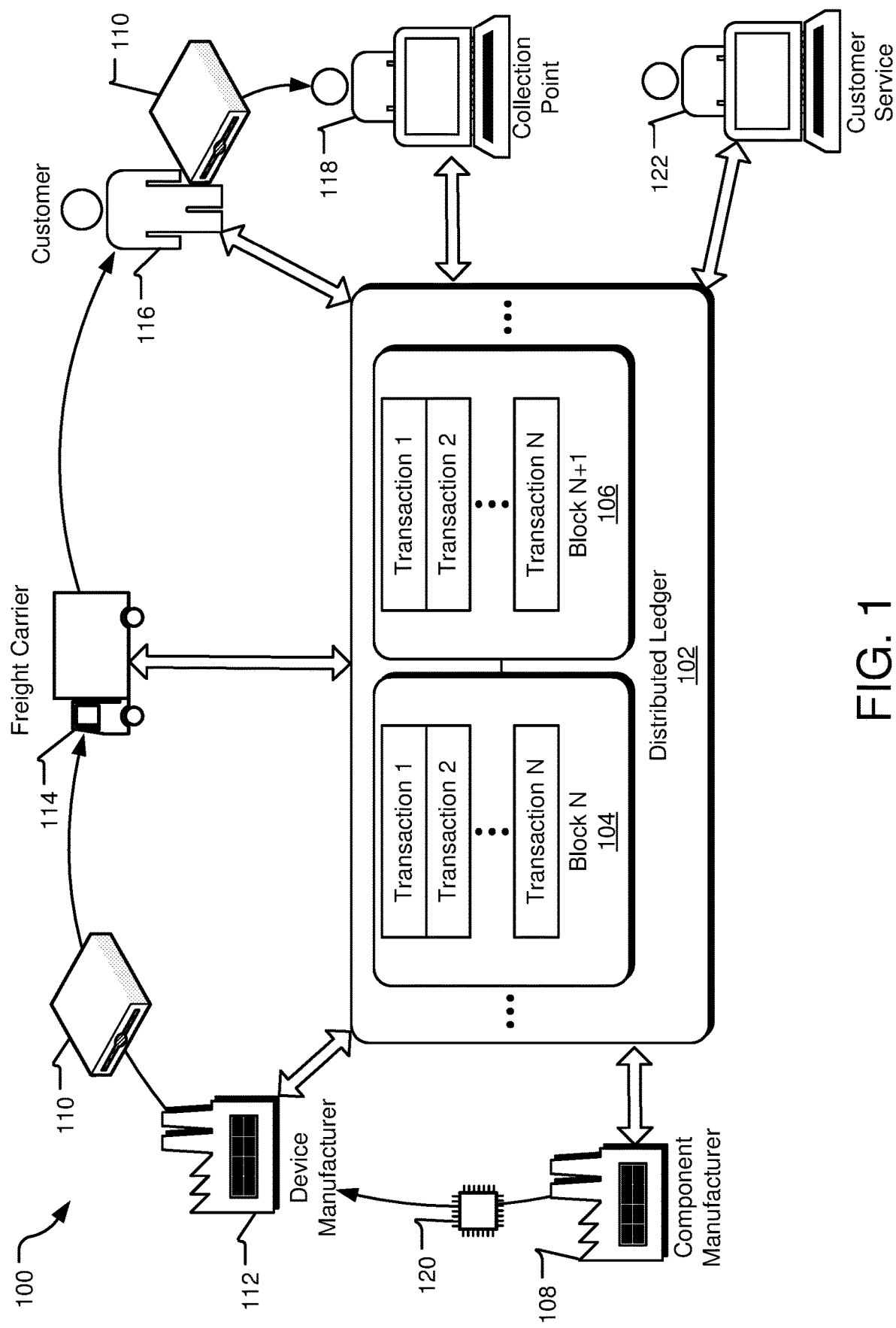
FIG. 1 illustrates an example block diagram of a device lifecycle using an example distributed ledger.

Implementations described herein provide a device lifecycle distributed ledger. The distributed ledger is utilized to document a device from device component manufacture, device manufacture, device delivery, device utilization, device update, and device end-of-life. The distributed ledger is supported and validated by a number of ledger nodes that are executed by varying parties such as the component manufacturer, device manufacturer, customer, and collection point. When device components, such as chips, are manufactured, the component manufacturer records or transmits transactions to the distributed ledger that identify one or more components. When the devices themselves are manufactured, the device manufacture records or transmits transactions to the distributed ledger that identify the device, the components used to manufacture the device, any keys implemented in the device, software/firmware versions executable in the device, ROM code executable on the device, etc. Furthermore, when the components and devices are transported between different parties, such as components between the component manufacturer and the device manufacturer and devices between the device manufacturer and customers. When devices are utilized by a customer, the devices (or a host connected to the device, user, etc.) may transmit transactions to the distributed ledger with device identifying information, operational logs, code measurements, pictures of the device, etc. These transactions that identify devices, components, functionality, and operational logs are referred to herein as attestation transactions. The attestation transactions are utilized to authenticate, verify, and validate security, integrity, and the state of devices.

The distributed ledger described herein further supports command transactions. Command transactions are transactions transmitted to a device (or a host device) that include keys for unlocking device capabilities or functionality and/or instructions for performing actions. For example, a storage device may be implemented with encryption functionality. However, the customer using the device did not pay for the encryption functionality when the storage device is initially purchased. Subsequently, the customer pays for the functionality and such a payment may be recorded to the distributed ledger as a transaction. In response, the device manufacturer transmits a command transaction to the device, and the command transaction includes a key for unlocking the encryption capability. The storage device uses the received key to unlock the encryption capability. Similarly, command transactions sent to devices may include instructions to perform attestation transactions. Command transactions may also include a "Disable Token," which are keys or instructions for disabling the device. In summary, command transactions include instructions, keys, and/or signed digital certificates for changing the behavior of the recipient device.

Thus, the distributed ledger provides a rich attestation history of a device that may be used by device manufacturers, device distributors, governmental entities (e.g., determine whether the device satisfies standards and/or compliance), consumers, customers, etc. Downstream parties such as consumers and distributors use the distributed ledger to determine that the devices are authentic and have integrity. Furthermore, the consumers can use the distributed ledger to determine where device components, and in some circumstances, can use the distributed ledger to determine that minerals for manufacturing components originate from non-conflict areas. The device/component manufactures use the distributed ledger to monitor device activity, functionality, security, etc. The distributed ledger can be used to determine when/why a device fails or was compromised. Furthermore, the distributed ledger can be used for trusted device RMA. Furthermore, because devices are directly connected (via networking capability in the device or through a host computing device) to the distributed ledger, the distributed ledger is used to change the behavior of the devices through command transactions. These and other implementations are further described below with respect to the figures.

FIG. 1 illustrates an example block diagram 100 of a device lifecycle using an example distributed ledger 102. Specifically, FIG. 1 illustrates the block diagram 100 of a storage device 110 as it is manufactured, shipped, and used by various parties. The distributed ledger 102 is utilized to track the various stages of the lifecycle of the storage device 110. It should be understood that the distributed ledger 102 may be utilized for tracking lifecycles of other types of digital devices such as sensors, appliances, laptops, desktops, mobile phones, tablets, gaming systems, internet of things (IoT) devices, etc. The distributed ledger 102 stores an immutable history of transactions including attestation transactions, activation/command transactions, product origin/provenance history transactions, etc.

The distributed ledger 102 documents various transactions involving different devices such as the storage device 110. In FIG. 1, the distributed ledger 102 is a blockchain, but it should be understood that the distributed ledger 102 may configured in a different format, such as a directed acyclic graph, a chain of transactions, etc. In the illustrated implementation, the distributed ledger 102 includes a number of blocks that include a number of validated transactions. A block N 104 includes transaction 1 to transaction N and a block N+1 106 includes transaction 1 to transaction N. The blocks (e.g., the block N 104 and the block N+1 106) may include other data and metadata, such a previous hash, a nonce, a Merkle root, date, time node software version, etc.

The distributed ledger 102 is supported by a number of different "nodes." Nodes are computer systems executing processor executable instructions for supporting the distributed ledger 102. In some example implementations, nodes may be implemented in various types. For example, a full ledger node is a node that stores a substantially complete copy of the distributed ledger 102. A validation node is a node that may validate and approve transactions and/or blocks for inclusion in the distributed ledger 102. A contributor node is a node that contributes transactions for validation on the distributed ledger 102. A consumer node is a node that may consume and verify transactions on the distributed ledger 102. It should be understood that other types of nodes are contemplated.

The distributed ledger 102 may be implemented as a private (permissioned) ledger, a hybrid private/public ledger, or a fully public ledger. A private ledger is a ledger where each node supporting the ledger is authenticated or authorized to use the ledger. Furthermore, a private ledger may not be publicly visible or accessible by some nodes or outside parties. In a public distributed ledger, the full distributed ledger 102 is distributed publicly to many nodes and is accessible to all nodes in the network. Each node supporting the ledger includes a cryptographic identity, which may comprise a public/private key pair.

Different types of transactions may be transmitted to, approved by, and stored in the distributed ledger 102. An attestation transaction includes information that attests to authenticity, integrity, components, logs, etc. of a specific product throughout the lifecycle of the product. A command transaction is a device specific transaction that instructs the device to perform a certain action. Such actions may include, for example, activation/unlocking of device capabilities (e.g., based on a contract recorded to the distributed ledger), device destruction, device activation, device attestation (e.g., an instruction to transmit an attestation transaction to the distributed ledger 102), etc. Transactions sent to the distributed ledger may include information such as product part/serial number, date and time, describing characteristics, components and sub-assemblies, originator identity, destination identity, configuration information, origin/location, certificates (e.g., keys), photographs, images, etc.

In FIG. 1, a component manufacturer 108 manufactures components for a device manufacturer 112. In the illustrated implementation, the component manufacture 108 manufactures computer chips (e.g., a chip 120) for different storage devices. The component manufacturer 108 may execute a node (e.g., on a computing machine) that supports and transmits transactions to the distributed ledger 102. As the chips are manufactured, the component manufacturer 108 may record attestation transactions to the distributed ledger 102 that identify the chips. For example, when the chips are manufactured, identifying information may be printed/etched on the chips. Such information may include a key, serial number, or random immutable identifier. As the chips are manufactured, the keys may be etched on the chips, may be an inherent part of the digital design, and/or may be burned to the device such as with digital fuses or non-volatile memories, the keys or serial numbers may be recorded to the distributed ledger as an attestation transaction. It should be understood that other types of information may be used to identify the chips, such an etched design. If an etched design is used to identify the chips, then a photo or other representation of the etched design may be recorded to the distributed ledger 102 via an attestation transaction. The transactions are signed by a private key of the ledger node of the component manufacturer 108. The other nodes supporting the distributed ledger 102 may verify the transactions based on a public key associated with the private key of the component manufacturer 108.

In some example implementations, mineral suppliers for the component manufacturer 108 utilize the distributed ledger 102 to establish a record of the mineral extraction. For example, shipments of gold, silicon wafers, and other materials may be tracked via the distributed ledger 102. The mineral suppliers may record a transaction to the distributed ledger when the minerals are extracted, shipped, and/or delivered to component manufacturers. Furthermore, the mineral information may be included in a transaction recorded to the distributed ledger when the components are manufactured, thus establishing a record of minerals used for components.

A number of chips, software, and other components may be shipped to a device manufacturer 112 from the component manufacturer 108. As the components and/or software are shipped, another transaction may be recorded to the distributed ledger 102 that includes identifications of the components and software (e.g., via keys) that are shipped. The transaction is signed by the private key of the component manufacturer 108 (or a software developers), and the public key associated with the private key is used to verify the transaction by other nodes participating in the distributed ledger network. In some implementations, the transaction includes identifying information for the destination, such as the device manufacturer 112. When the device manufacturer 112 receives the shipment of components, the device manufacturer may record a transaction to the distributed ledger 102 that includes identifications of the components received. These transactions may be implemented by associating the component identifying information with a barcode, QR code, or other readable optical label, which is printed on a package that includes the components. The association may be recorded as a transaction to the distributed ledger 102. As the components are shipped, the component manufacturer scans the optical labels and records the transaction with component identifying information. When the components are received by the device manufacturer 112, the device manufacturer 112 scans the optical label and records the transaction including the component identifying information to the distributed ledger 102. It should be understood that the transactions may be implemented using other components and processes, such as by using radiofrequency identification (RFID) included in a package and/or the devices. In such an implementation, the RFID transmits component identifying information to the scanning device, and the component identifying information may be recorded to the distributed ledger 102. The optical label (or RFID) may be associated with a weblink, software application, etc. that is used as an interface to record the transaction to the distributed ledger.

In the illustrated implementation, the device manufacturer 112 manufacturers storage devices (e.g., the storage device 110). A transaction associated with each storage device that the device manufacturer 112 manufactures is recorded to the distributed ledger 102. For example, attestation transactions are recorded for each device that includes device type (e.g., encryption drive, hard-disc drive, solid-state drive, etc.), serial number, components, device capabilities, device public keys, etc. The transaction may include a listing of the various components that are included in the device. For example, the storage device 110 is manufactured using the chip 120. As such, the attestation transaction recorded by the device manufacturer 112 includes an identification of the chip 120.

Similar to the components, as the devices are shipped to various vendors, customers, etc. transactions are recorded to the distributed ledger 102. The transactions indicate the type(s) of device shipped and may include device identifying information such as a serial number, keys, etc. associated with the device. Furthermore, the devices may be packaged and include labeling that include QR codes or other optical labeling that may be scanned as the device are shipped. Accordingly, the device identifying information is associated with the QR codes or bar codes. As the devices are received by various parties (e.g., a freight carrier 114), the optical labeling is scanned, which initiates a transaction that indicates receipt of the devices. Furthermore, the freight carrier 114 (or other receiving parties) may scan the QR code, which initiates the opening of a software application, web portal, etc. that allows the parties to examine the distributed ledger to assess the contents of a package. For example, if freight includes boxes with a number of storage devices manufactured by the device manufacturer 112. Customs agents scan a QR code printed on a package of the storage devices to determine whether the contents satisfy standards such as UL certifications, American National Standards Institute (ANSI) standards, etc.

Furthermore, transactions may be recorded to the distributed ledger when the devices are purchased by customers, such as a customer 116. For example, a vendor records a transaction to the distributed ledger 102 when the customer 116 purchases the storage device 110. The transaction may identify the device and include device identifying information. The transaction may also include identifying information for the customer 116. When the customer 116 installs and/or uses the device, an attestation transaction may be recorded to the distributed ledger 102. The attestation transaction may include measurements of software, firmware and/or ROM code, which may be signed by a key securely stored in the device (e.g., signed by a hardware root key fused into an application specific integrated circuit (ASIC)). The transaction may be recorded via the device itself or via a host computing device communicatively connected to the device.

Because the attestation information (e.g., the measured ROM code) is recorded to the distributed ledger, the device manufacturer 112 (or an associated party) may determine whether the device is executing the correct code. In other words, the device manufacturer 112 has information about the expected measurements of the ROM code, software versions, firmware versions, etc. If the measurements recorded in the attestation transaction do not match the expected measurements, then the storage device 110 may be compromised (e.g., executing malware). The device manufacturer 112 (or the associated party) may take corrective action by notifying the customer 116 or transmitting a command transaction to the customer 116 that identifies the storage device 110. The command transaction may include instructions for updating the device, for example.

As the customer 116 utilizes the storage device 110, different parties (e.g., nodes) to the distributed ledger 102 may record different transactions that involve the storage device 110 to the distributed ledger. For example, the device manufacturer 112 (or an associated party, such as a vendor) may send command transactions to the storage device 110 that are recorded on the distributed ledger 102. The command transactions may include certificates with keys to unlock features of the devices, instructions to activate features, instructions to record an attestation transaction, instructions to erase data, instructions to self-destruct, etc. For example, the customer may have previously paid for encryption features for the storage device 110, and such a payment (transaction) may be recorded to the distributed ledger 102. When the device is started up (activated), the device manufacture 112 sends a command transaction to the storage device 110 via the distributed ledger, where the command transaction includes a key for unlocking encryption features. Similarly, locked storage capacity may be unlocked responsive to a command transaction (which may be sent responsive to a customer upgrade transaction). Other device capabilities that may be unlocked include additional storage, device backup, device optimization (for different device uses such as surveillance, video storage, server drives, etc.) For devices other than storage devices, other capabilities may be unlocked. In some example implementations, a device is provided a license for capabilities. For example, a storage device is provided a license for data backup to a remote device via a command transaction.

In some implementations, command transactions may be implemented via smart contracts. For example, a smart contract may be recorded to the distributed ledger that transmits command transactions to device responsive to a payment by a customer. For example, if the customer wishes to unlock or activate encryption features of the device, the customer may "pay" the smart contract, and the smart contract releases a key to the device via a command transaction. Other uses of smart contracts (or computing contracts) are contemplated for the distributed ledger 102.

In some example implementations, command transactions that include a "disable token" are sent to devices. The disable token may be a set of instructions or keys for disabling the device. For example, if a storage facility or server has been compromised, command transactions including the disable token may be sent to one or more devices of the server via the distributed ledger 102.

In some example implementations, the device manufacturer 112 (or an associated party) may transmit a command transaction to the storage device 110 (and recorded on the distributed ledger 102) that commands the device to record an attestation transaction. The storage device 110 may, in response, measure the ROM code and other device parameters and record such information to the distributed ledger 102 as an attestation transaction. As such, the device has certified the device functionality, and such certification may be used by the device manufacturer 112 to determine that that the device has not been compromised (e.g., by malware) and is executing up to date firmware. If the storage device has been compromised or is executing old firmware, the device manufacturer 112 can record/transmit another command transaction with update information for the storage device 110.

The storage device 110 may generate and transmit other types of attestation transactions. For example, customers may want to prove that data has been erased. The customer 116 may securely erase the storage device 110 and record a transaction to the distrusted ledger 102 indicating as such. Similarly, the storage device 110 may record access logs and other types of logs for the storage device 110. For example, if a party accesses the storage device 110, then a transaction is recorded that indicates that the party accessed the storage device with date and time of access, etc. Similarly, the storage device may be locked (prevented from being accessed) and a transaction may be recorded to the distributed ledger 102 indicating as such. Other types of attestation transactions are contemplated. It should be understood that the attestation transactions include a representation of the status of the storage device. The status may include, without limitation and as described above, measurements of software, measurements of firmware, measurements of ROM code, access logs, an indication of secure erase, an indication of encryption, an indication of being locked, etc.

Occasionally a device fails, is outdated by new technology, etc. and needs to be returned. For example, the storage device 110 fails during its warranty period. The distributed ledger 102 is used to conduct return merchandise authorization (RMA). The customer 116 may transport the storage device 110 to a collection point, which may be a vendor or other party. In some example implementations, the customer 116 performs the RMA. The collection point 118 (or the customer 116) may examine the storage device 110, take a picture of the storage device 110 (including identifying information, such as a serial number), etc. and record such information to the distributed ledger 102 as an attestation transaction. Furthermore, the collection point 118 may record a video or take a picture of the device being destroyed (e.g., by punching a hole through it) and record such information with the attestation transaction. Thus, the distributed ledger 102 is used to prove that the storage device is destroyed and will not be resold (e.g., on the black market). These RMA attestation transactions are types of "end-of-life" transactions. In some example implementations, the storage device 110 may self-destruct by running read/write heads into the disc or other means. Such functionality maybe logged and recorded to the distributed ledger 102 as an attestation transaction.

Such RMA transactions may be implemented using a user interface (UI) on a smart device such as a mobile phone, laptop, etc. The user interface may be activated responsive to a user scanning a QR code printed on the device and/or the device package, typing in a URL in a web browser, etc. The UI may include an input form for inputting device and customer information. The form may also request that the user take a picture of the device. The picture and the input information may be recorded to the distributed ledger 102 as an attestation transaction.

During the lifecycle of the blockchain, the device manufacturer 112 and/or an associated customer service 122 may monitor transactions involving the storage device 110. For example, the customer service 122 monitors the transactions involving the storage device 110. The customer service 122 may analyze logs that are recorded to the distributed ledger 102 by the storage device 110 (or host device). The transactions may indicate that the storage device is configured/optimized for use in a server, but the customer 116 is using the storage device 110 for storing video surveillance files, which typically are not stored on a server device. As such, the customer service 122 may recommend to the customer 116 that the customer 116 upgrade to a different device or that the storage device 110 be re-optimize for the specific use. If the customer 116 agrees, then a new device is shipped or an optimization transaction (command transaction) is recorded to the distributed ledger 102 such that the storage device 110 may optimize for the specific use.

If the storage device 110 is not destroyed and is returned to the device manufacturer 112 or another party, then information about the return is recorded to the distributed ledger 102. When the storage device 110 is received, another transaction may be recorded. If the storage device 110 is repaired, refurbished/reconditioned, and shipped, then the lifecycle blockchain as illustrated in FIG. 1 is repeated.

Because attestation transactions are recorded during each step of the lifecycle of the storage device 110, the lifecycle of the storage device 110 is documented. Thus, a party, such as the device manufacturer 112 may securely track the lifecycle of the product. The lifecycle of the product includes information about transport, activation, operational logs, end-of-life, etc. Furthermore, since the attestation transactions include information about product components, a party may verifiably determine where the components of a device were manufactured. The distributed ledger 102 provides a rich history of product lifecycle that may be used for product analysis. Furthermore, security of products is enhanced because a customer may determine that a purchased product is a legitimate product using the distributed ledger 102. Similarly, a distributor uses the distributed ledger 102 to determine that receive products are authentic. If a product becomes compromised or fails, the distributed ledger provides a rich history of device attestation that can be used to determine the point in time of failure and any attendant circumstances.

Addition of a block of transactions to the distributed ledger is based on an authority proof consensus mechanism. Addition of a block of transaction requires that all the transactions are validated by N "stakeholder" nodes supporting the distributed ledger 102. Stakeholder nodes include validation nodes (e.g., nodes that are configured to validate transactions), which include, for example, component supplier nodes (e.g., the component manufacturer 108), product supplier nodes (e.g., the device manufacturer 112), customers/consumers (e.g., the customer 116), commerce authority nodes (e.g., a customs authority), e-commerce provider nodes, etc. The stakeholder nodes are required to participate in transaction and block validation process and commit resources to support the distributed ledger 102.

For a block to be officially recognized on the distributed ledger 102, M additional blocks may be added to the block chain and accepted by X trusted nodes. Upon consensus of a block, a nonce is generated for the block. The nonce is a digital signature (Merkle root of the transactions of the block), and the digital signature is the signed hash countersigned by all (or X) value stakeholder nodes (trusted nodes). The hash is signed by the private key of the validating nodes, thus other nodes of the distributed ledger 102 can validate the block based on public key verification. The trusted nodes are incentivized to contribute to the distributed ledger 102 by promoting secure lifecycle tracking of devices such that device value is not diminished based on stolen or copied devices. Other incentives may be provided. For example, a customer that executes a node to support the distributed ledger 102 may be provided with discounts on products. These discounts may be provided via coins issued to parties (nodes) that support the distributed ledger 102.

Figure 2:
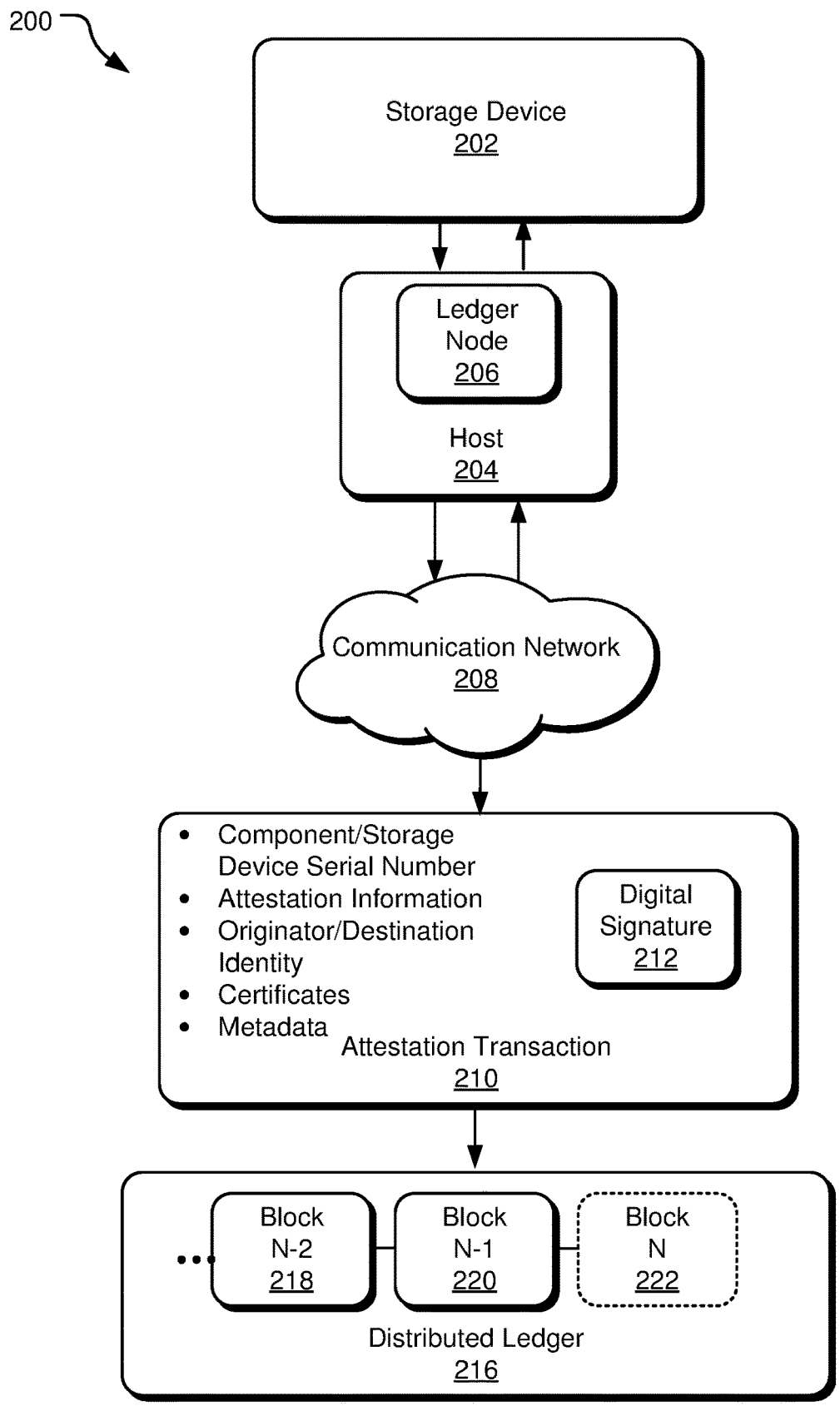
FIG. 2 illustrates a block diagram of an example transaction being recorded to an example distributed ledger.

FIG. 2 illustrates a block diagram 200 of an example transaction 210 being recorded to an example distributed ledger 216. The block diagram includes a storage device 202 and a host 204 executing a ledger node 206. It should be understood that the implementations described with respect to FIG. 2 may be utilized with devices other than storage devices, such as sensors, appliances, laptops, desktops, mobile phones, tablets, gaming systems, internet of things (IoT) device, etc. The storage device 202 is illustrated as being separate from the host 204, but it should be understood that storage device 202 may be implemented in the host 204.

The ledger node 206 may be implemented as processor executable instructions stored in memory of the host 204 and executed by a processor of the host. The ledger node 206 is configured to consume transactions from the distributed ledger and transmit transactions to the distributed ledger 216. In some example implementations, the ledger node 206 verifies transactions on the distributed ledger 216. Also in some example implementations, the ledger node 206 validates and approves transactions and/or blocks for inclusion in the ledger. Furthermore, in some example implementations, the ledger node 206 stores a full or substantially full copy of the distributed ledger 216. The ledger node 206 is communicatively connected to the distributed ledger 216 (e.g., other nodes of the ledger) via a communication network 208. The communication network 208 may be wired and/or wireless networks and include various communication network components for facilitating communications and transactions between nodes and devices.

In FIG. 2 the ledger node 206 is recording the transaction 210 (hereinafter "attestation transaction" 210) to the distributed ledger 216. The attestation transaction 210 includes, for example, without limitation, component/storage device identification, attestation information, origin/destination identity, certificates, and metadata. The storage device identification may include a serial number or other identifying information (e.g., a public key) for the storage device 202 and or storage device components. The attestation information may include a measurement of ROM code and other executable code (e.g., software, firmware) on the storage device 202, access logs of the storage device 202, operation logs of the storage device 202, encryption information, backup information, backup confirmation, configuration information, device component identifications, etc. For example, if the storage device 202 is configured for periodic backup to another location (e.g., a backup storage device), an attestation transaction may be recorded to the distributed ledger 216 indicating that that backup is complete, thus providing a secure log of backups. The configuration information may include model numbers, feature packages, options, part numbers etc.

The origin identity may include a public key component of a public private key pair associated with the identity of the originator (e.g., the host 204 or the storage device 202). The destination identity is the receiver of the attestation transaction 210. In FIG. 2, the receiver may be the device manufacturer or an associated party. In some example implementations, the originator and destination identify may be the same identity (e.g., the host 204 ledger node 206) sends transaction to itself to record attestation information to the distributed ledger 216.

The certificates may be digital certificates or digital representation of physical certificates for a variety of product or component certificates. Such certificates may include key certificates (identity public key certificate), key authority certificates, component or product finger prints, governance certificates (e.g., conflict minerals, UL, Origin, Trade Classifications). Other types of certificates are contemplated, and the certificates may include computed elements of time, expiry, etc.

The attestation transaction 210 may also include descriptions of characteristics that identify the component or product electronically or visually. These characteristics can be used for further attestation and fingerprinting of the unique device. Such describing characteristics may include a picture of the device, picture of the device serial number, picture of a unique etching on the device, etc. The attestation transaction 210 may further include metadata such as date/time the transaction is signed, validity, algorithm version of the ledger node 206, and other information. Such information may be used to identify and validate the attestation transaction 210 for the distributed ledger 216.

The attestation transaction 210 further includes a digital signature 212, which signs the attestation transaction 210. In some example implementation, the attestation transaction 210 is signed by the private key of the transaction originator (e.g., the host 204). As such, the digital signature 212 is used to verify that the attestation was transmitted from an authorized entity (e.g., based on the public key associated with the private key).

The distributed ledger 216, which is supported by the ledger node 206 and other nodes not pictured in FIG. 2, includes a plurality of blocks, each with a number of transactions. The distributed ledger 216 includes a block N−1 220 and a block N−2 218. The block N−1 220 is the most recent block added to the distributed ledger 216. In other words, the block N−1 is the most recently validated and approved for the distributed ledger 216. The blocks are "chained" because each subsequent block includes a hash of the previous block. For example, the block N−1 220 includes a hash of the previous block, the block N−2 218, etc. A block N 222 is the next block in the distributed ledger 216. The block N has not been validated yet. The attestation transaction 210, if approved/validated, may be included in the block N once it is included in the distributed ledger 216.

It should be understood that attestation transaction may be sent or recorded by a party other than the host 204. As described above with respect to FIG. 1, a device manufacturer may record attestation transactions upon manufacture of a device. Such attestation transactions establish the existence and authenticity of a device. After the devices are manufactured, various other parties (e.g., freight carriers, vendors) may also transmit/record attestation transactions to the distributed ledger 216.

In some example implementations, the devices themselves generate attestation information, generate attestation transactions, and transmit the generated attestation transactions to the distributed ledger. In other words, the devices host the ledger node 206 and are configured to interact with the distributed ledger and record attestation transactions (e.g., as the ledger node 206). It should be understood that such implementations may be included in the devices other than the storage devices such as sensors, appliances, laptops, desktops, mobile phones, tablets, gaming systems, internet of things (IoT) device, etc. For example, a connected home security system is configured to interact with the distributed ledger 216. The home security system may include hardware (e.g., processors), software, firmware, immutable ROM code, etc. The home security system measures or analyzes its internal digital characteristics (e.g., the software, firmware, and/or the immutable ROM code) to generate attestation information. The internal digital characteristics may be measurements (e.g., generated via a boot sequence) of the software, firmware, and/or ROM code, or versions of the software, firmware, etc. The internal digital characteristics may also include processor (or other hardware) type, capabilities, etc. The attestation information is included in an attestation transaction generated by the home security system and transmitted to the distributed ledger 216. The devices may be configured to periodically, intermittently, etc. transmit such attestation transactions to the distributed ledger to provide a rich and secure record of device characteristics. In some example implementations, a variety of different devices (e.g., laptop, desktop, appliances, IoT device) are configured to interact with the distributed ledger 216 through a central hub (e.g., the host 204).

Figure 3:
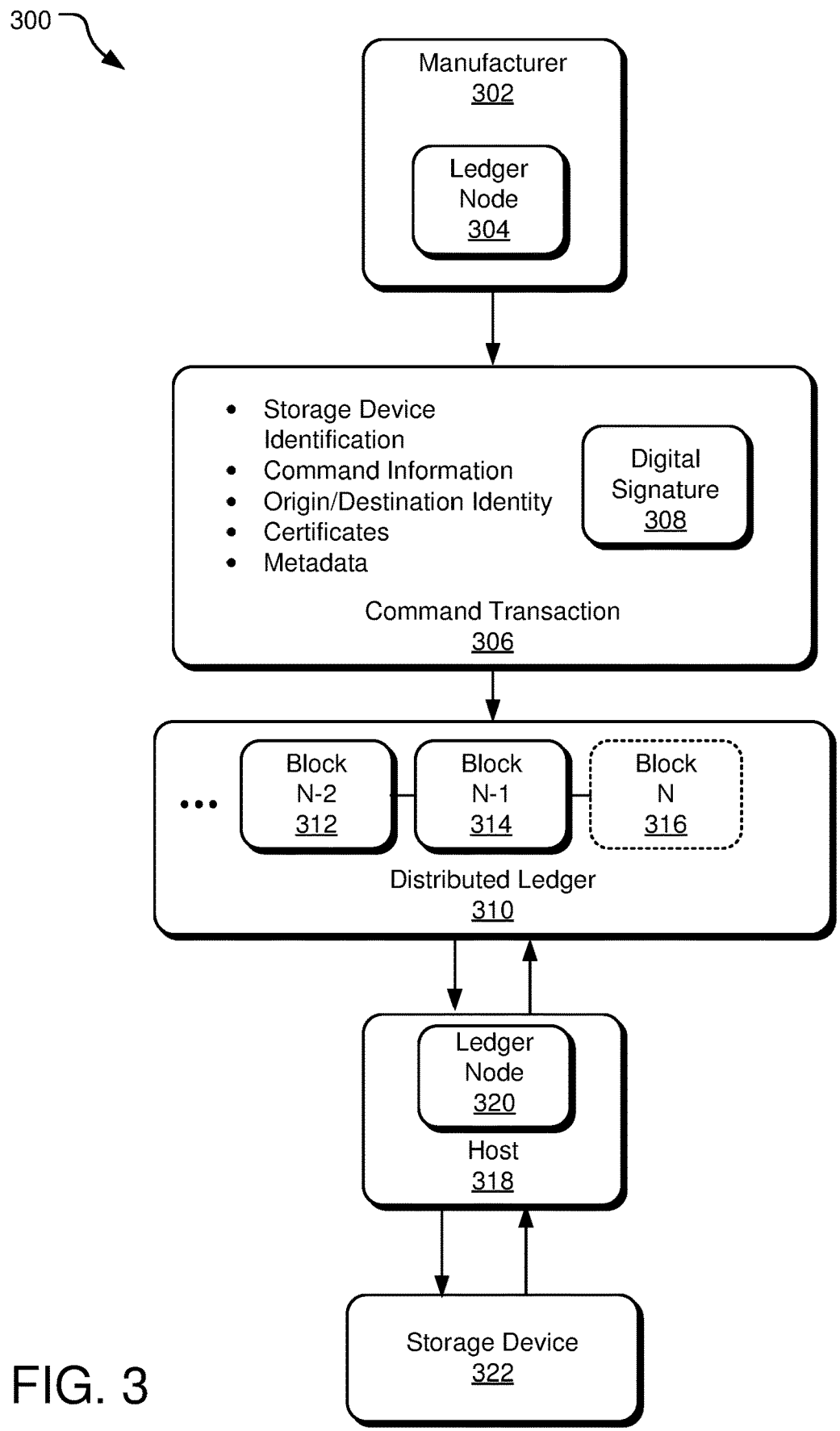
FIG. 3 illustrates another block diagram of an example transaction being recorded to an example distributed ledger.

FIG. 3 illustrates another block diagram 300 of an example transaction 306 being recorded to an example distributed ledger. The block diagram 300 includes a storage device 322 and a host 318 executing a ledger node 320. It should be understood that the implementations described with respect to FIG. 3 may be utilized with devices other than storage devices. The storage device 322 is illustrated as being separate from the host 318, but it should be understood that storage device 322 may be implemented in the host 318. The block diagram 300 also includes a manufacturer 302, which manufactures storage devices, such as the storage device 322. The manufacturer is also executing a ledger node 304 (e.g., on a computing machine).

The ledger nodes 304 and 320 may be implemented as processor executable instructions stored in memory of a computing machine (e.g., a host 318 includes a memory storing instructions for the ledger node 320) and executed by a processor of the computing machines. The ledger nodes 304 and 320 are configured to consume transactions from the distributed ledger 310 and transmit transactions to the distributed ledger 310. In some example implementations, the ledger nodes 304 and/or 320 verify transactions on the distributed ledger 310. Also in some example implementations, the ledger nodes 304 and 320 validate and approve transactions and/or blocks for inclusion in the distributed ledger 320. Furthermore, in some example implementations, the ledger nodes 304 and 320 stores a full or substantially full copy of the distributed ledger 310. The ledger nodes 304 and 320 are communicatively connected to the distributed ledger 310 (e.g., other nodes of the ledger) via a communication network (not shown). The communication network may include wired and/or wireless networks and include various communication network components for facilitating communications and transactions between nodes and devices.

In some example implementations, the ledger nodes 304 and 320 are limited in the types of transactions that they are allowed to transmit to the distributed ledger. For example, the host ledger node 320 (e.g., a consumer node) is not permitted to transmit command transactions. In such example implementations, if the host ledger node 320 transmits a command transaction to the distributed ledger, other nodes (e.g., the ledger node 304 of the manufacturer 302) may reject the command transaction (or not validate it). Similarly, transactions may not be validated if the transactions identify a device that is not "assigned to" or associated with a node. For example, If the host ledger node 320 transmits an attestation transaction identifying a device and the distributed ledger transaction history (e.g., blockchain) indicates that the identified device is "owned" by another node (e.g., another consumer node), then the transaction may be rejected.

In FIG. 3, the ledger node 304 of the manufacturer 302 is transmitting the transaction 306 (hereinafter "command transaction 306") to the storage device 322 (e.g., the host 318 and/or the ledger node 320). The command transaction 306 includes, for example, without limitation, storage device identification (e.g., serial number or key), command information, origin/destination identity, certificates, and metadata. The storage device identification may be a serial number of the storage device 322. The origin identity may include a public key component of a public private key pair associated with the identity of the originator (e.g., manufacturer 302 or the ledger node 304). The destination identity is the receiver of the command transaction 306. In FIG. 3, the receiver is the storage device 322. However, the destination may be identified as the host 318 because it is communicatively connected to the storage device 322. For example, the host 318 may receive the command transaction 306 (e.g., based on a public key of the host being the destination identity). The host 318 may identify the storage device 322 as the intended receiver of the command transaction 306 based on the storage device identification included in the command transaction 306. Thus, the host 318 may transmit the relevant information to the storage device 322 (e.g., command information and certificates).

The command information and certificates included in the command transaction 306 may be used by the storage device 322 to process the command. For example, the certificates may be associated with keys for unlocking device capabilities (e.g., unlock additional storage, unlock encryption capabilities). Furthermore, the command information may include instructions for recording an attestation transaction to the distributed ledger 310. Other command information may include instructions for recording logs, performing a data backup, self-destruction, etc. as attestation transactions for the distributed ledger 310

The command transaction 306 further includes a digital signature 308, which signs the command transaction 306. In some example implementation, the command transaction 306 is signed by the private key of the transaction originator (e.g., the ledger node 304 of the manufacturer 302). As such, the digital signature 308 is used to verify that the attestation was transmitted from an authorized entity (e.g., based on the public key associated with the private key).

The distributed ledger 310, which is supported by the ledger nodes 304 and 320 and other nodes not pictured in FIG. 3, includes a plurality of blocks, each with a number of transactions. The distributed ledger 310 includes a block N−1 312 and a block N−2 314. The block N−1 314 is the most recent block added to the distributed ledger 310. In other words, the block N−1 314 is the most recently validated and approved for the distributed ledger 310. The blocks are "chained" because each subsequent block includes a hash of the previous block. For example, the block N−1 314 includes a hash of the previous block, the block N−2 312, etc. A block N 316 is the next block in the distributed ledger 310. The block N has not been validated yet. The command transaction 306, if approved/validated, may be included in the block N once it is included in the distributed ledger 310.

The ledger node 320 may be configured to monitor the distributed ledger 310 and identify transactions intended for the host 318 (e.g., as indicated by the destination identity). In some example implementations, the transactions intended for the host 318 are sent directly to the host 318. In other example implementations, all transactions are sent to all nodes supporting the distributed ledger 310. Once the transactions are verified, the receiving party may extract the information (e.g., command information) for the receiving device. For example, once the command transaction 306 is verified by the nodes of the distributed ledger 310 and included in the block N 316, then the host ledger node 320 extracts information for the storage device 322 (e.g., the command information) and transmits such information to the storage device 322.

Figure 4:
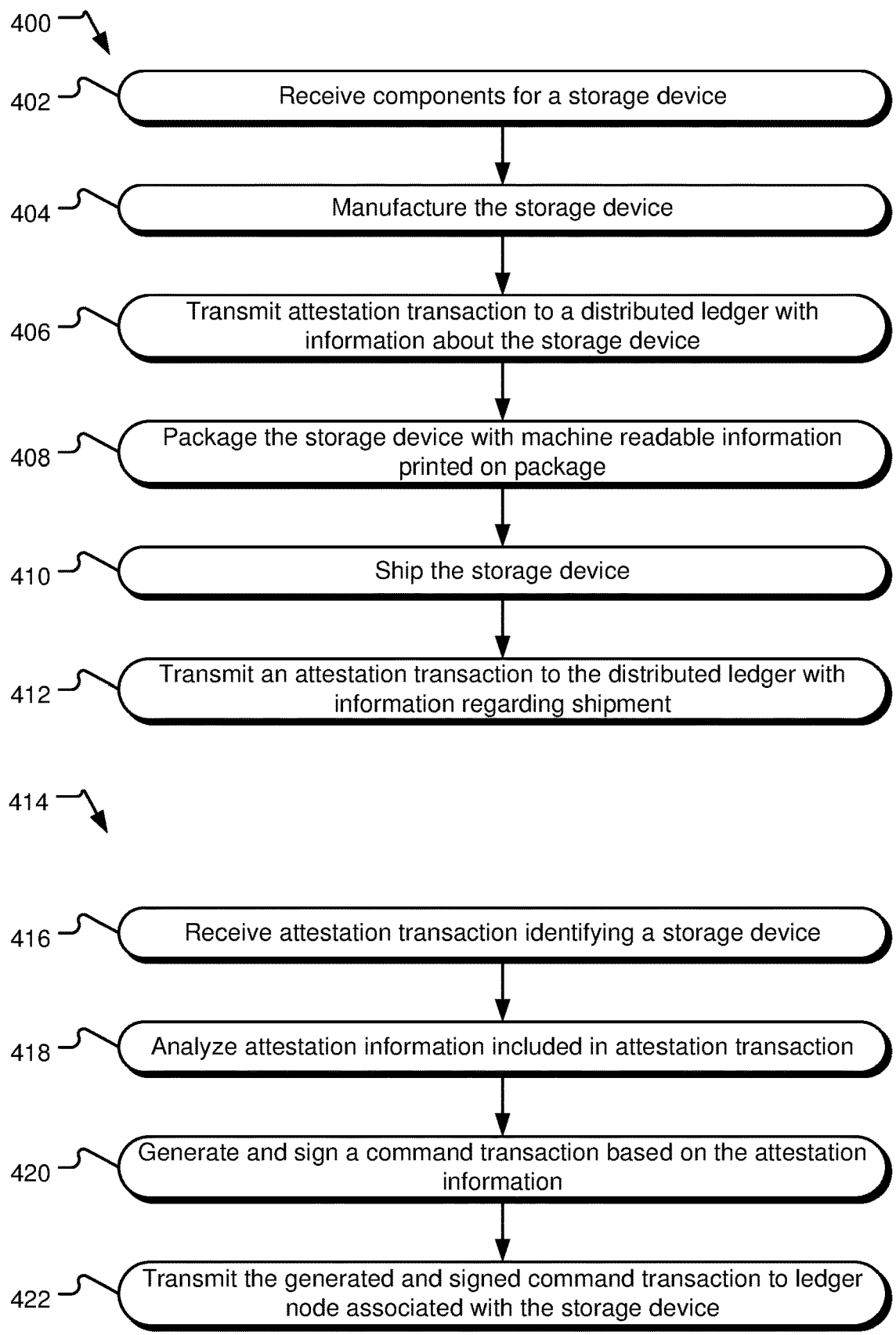
FIG. 4 illustrates example operations for utilizing an example distributed ledger described herein.

FIG. 4 illustrates example operations 400 and 414 for utilizing an example distributed ledger described herein. Specifically, FIG. 4 illustrates the operations 400 for utilizing an example distributed ledger from the perspective of a device manufacturer. The manufacturer or an associated party is executing a ledger node that monitors and supports the distributed ledger. A receiving operation 402 receives components for a storage device. Transactions that identify the components may be recorded in the distributed ledger. For example, a chip manufacturer may record a transaction identifying manufactured chips to the distributed ledger. As the components are shipped from component manufactures and received by the device manufacturer, transactions indicating the shipping of the components and receipt of the components may be recorded to the distributed ledger. A manufacturing operation 404 manufactures the storage device using the received components. A transmitting operation 406 transmits/records an attestation transaction to the distributed ledger with attestation information about the storage device. Such attestation information is generated and may include, for example without limitation, component listing (e.g., based on identifying information already recorded to the distributed ledger), device type, device capabilities, serial number, keys, etc. The attestation transaction is used to establish the authenticity, existence, and integrity of the product for later use.

A packaging operation 408 packages the storage device with machine-readable information printed on the package. The machine-readable information may be a QR code or bar code. In some example implementations, a RFID or NFC tag is included in the product or packages. These tags may be detectable and transmit information regarding the device or direct a party to find information regarding the device. For example, a party may scan a QR code using a device, and the QR code directs the scanning device to open an application or website that provides access to the network (e.g., the distributed ledger). In some implementations, a URL is printed on the package, and the user/consumer may type the URL into a web browser. Using the website or application, a customer/consumer may attain attestation of the authenticity and integrity of the product using the website or web application that accesses the distributed ledger. For example, the user scans the QR code on the package and the web application or website accesses the distributed ledger and retrieves information about the attestation transaction previously recorded (e.g., in the transmitting operation 406).

A shipping operation 410 ships the storage device. A transmitting operation 412 transmits an attestation transaction to the distributed ledger with attestation information regarding shipment. For example, a transaction may be transmitted to the distributed ledger for each storage device that is shipped. Each transaction may include information about the storage device and/or the receiving party for the shipment. In some implementations, one transaction may include information about multiple storage devices that are shipped. In such implementations, a package may include multiple storage devices that are identified using information printed on the package. Such information may be utilized similarly as described above with the packaging operation 408.

The operations 414 are example operations that may be performed by the device manufacturer (or an associated party) when an example device is being utilized by a consumer. The manufacturer or the associated party is executing a ledger node that monitors and supports the distributed ledger. A receiving operation 416 receives an attestation transaction identifying the storage device (e.g., the storage device manufactured in operations 400). In some example implementations, the manufactured devices are configured to periodically transmit attestation transactions to the distributed ledger. In the same or alternative implementations, the manufacturer (or the associated party) transmits command transactions to the devices that instruct the devices to transmit attestation transactions to the distributed ledger. The manufacturer may monitor the distributed ledger for such attestation transactions or directly receive the transaction (e.g., via the ledger node).

An analyzing operation 418 analyzes attestation information included in the attestation transaction. Such attestation information may include a measurement of ROM code, device identification, access logs, operation logs, etc. A generating operation 420 generates and signs a command transaction based on the attestation information. For example, the manufacturer may determine, based on the attestation information included in the attestation transaction, that the storage device is executing outdated software. As such, the generated command transaction may include information for updating the device to current software. The command transaction may be signed by the private key associated with the ledger node of the manufacturer. A transmitting operation 422 transmits the generated and signed command transaction to a ledger node associated with the storage device. For example, a host device communicatively connected to the storage device executes a ledger node and receives the transmitted command transaction. The ledger node may process the command transaction and communicate command information to the storage device.

Figure 5:
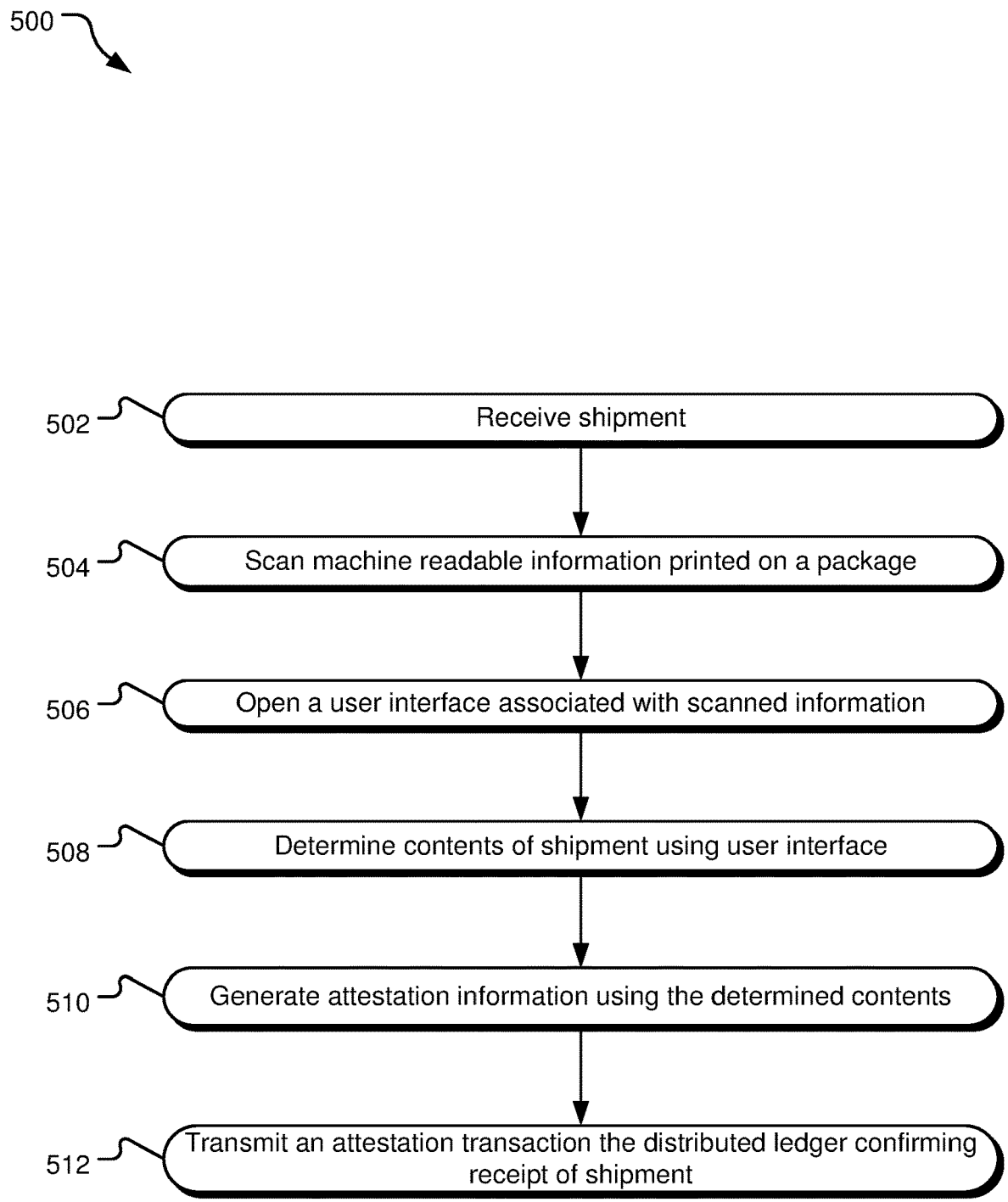
FIG. 5 illustrates example operations for utilizing an example distributed ledger described herein.

FIG. 5 illustrates example operations 500 for utilizing an example distributed ledger described herein. Specifically, FIG. 5 illustrates the operations 500 for utilizing the example distributed ledger from the perspective of an intermediary party such as a shipping company, customs authority, etc. A receiving operation 502 receives a shipment including the storage device. A scanning operation 504 scans machine readable information printed on a package of the shipment. Such information may be a QR code, bar code, etc. In some implementations, RFID or NFC tags inside the package are scanned. An opening operation 506 opens a user interface associated with the scanned information. A determining operation 508 determines contents of the shipment using the user interface. The user interface is configured to access the distributed ledger to determine the contents of the shipment. A generating operation 510 generates attestation information, which includes at least the device identifying information retrieved via the distribute ledger. A transmitting operation 512 transmits an attestation transaction to the distributed ledger confirming receipt of the shipment and identifying the contents of the shipment.

Figure 6:
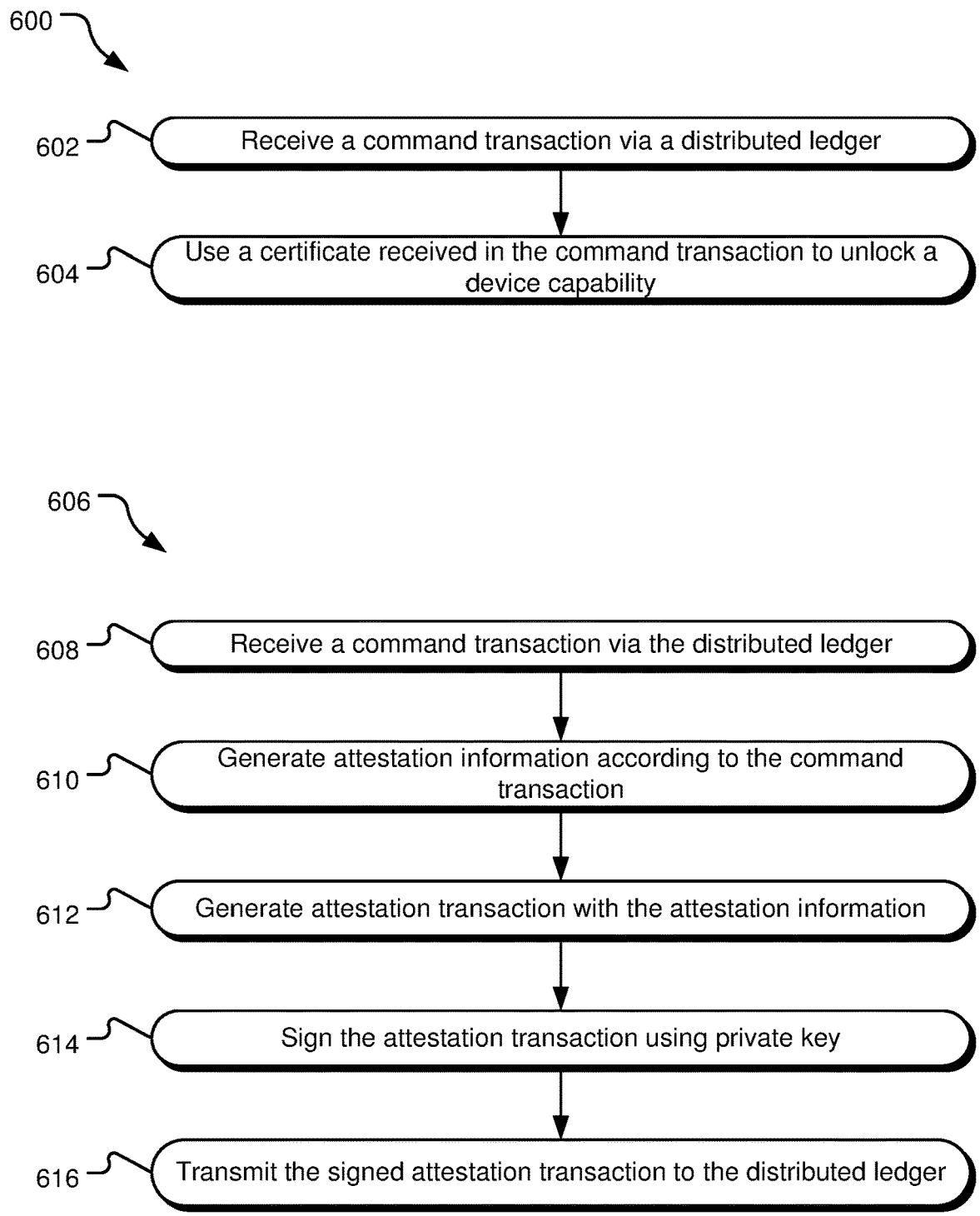
FIG. 6 illustrates example operations for utilizing an example distributed ledger described herein.

FIG. 6 illustrates example operations 600 and 606 for utilizing an example distributed ledger described herein. Specifically, FIG. 6 illustrates example operations from the perspective of a consumer utilizing a storage device. The consumer and/or the device executes a ledger node for accessing/supporting the distributed ledger. A receiving operation 602 receives a command transactions via a distributed ledger. A using operation 604 uses a certificate/key received in the command transaction to unlock a device capability. The capability may be storage capacity (e.g., capacity on demand), features (e.g., encryption, backup), etc. The host executing the distributed ledger may extract the certificate and transmit the certificate to the device. In some example implementations, the device itself executes a ledger node and opens the command transaction and utilizes the certificates.

In the operations 606, a receiving operation 608 receives a command transaction via the distributed ledger. The command transaction includes command instructions for the storage device to record an attestation transaction to the distributed ledger. A generating operation 610 generates attestation information according to the command transaction. The attestation information may include internal digital characteristics of the device (e.g., measurements or versions of software, firmware, and/or immutable ROM code). The attestation information may further include hardware identifying information and/or capabilities. A generating operation 612 generates an attestation transaction with the attestation information. A signing operation 614 signs the attestation transaction using a private key. The private key may be a key associated with a ledger node executing on the device, a host device, etc. A transmitting operation 616 transmits the signed attestation transaction the distributed ledger.

Figure 7:
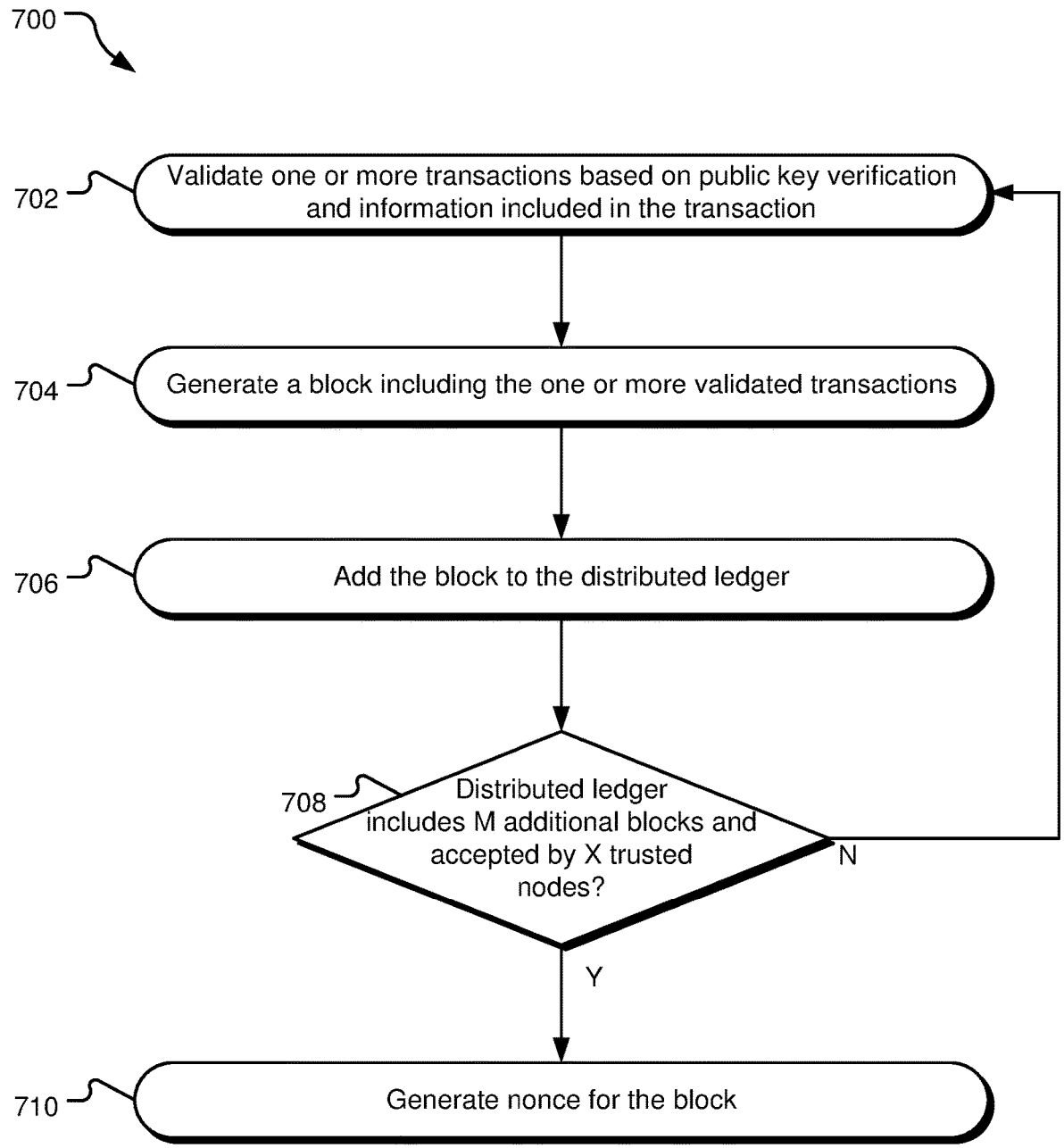
FIG. 7 illustrates example operations for determining consensus in an example distributed ledger described herein.

FIG. 7 illustrates example operations 700 for determining consensus in an example distributed ledger described herein. The operations 700 are illustrated from the perspective of a node supporting the distributed ledger. The node may be a validation node or a full ledger node. A validating operation 702 validates one or more transactions based on public key verification and information included in the transaction. For example, the validating operation includes determining whether the transaction is signed by a known node in the distributed ledger (e.g., public key verification). The validating operation 702 may also include analyzing details of the transaction. For example, if an attestation transaction includes identifying information about a storage device, the validating operation 702 may include determining whether the transacting node is authorized to transmit a transaction involving the identified device. Such a determination may include analyzing past transactions involving the device to determine whether the node has "title" of the device based on past attestation transactions. If the past history indicates that the node has title (e.g., the device went from the device manufacturer, to shipping party, to a vendor, to the customer executing the transacting node), then the transaction is validated. If the history does not indicate that the transacting node has correct "title" then the transaction is not validated. If a transaction is not validated based on incorrect title history, then a trusted node may be notified such that the node may take corrective action (e.g., correct title or transmit a deactivation command to the device).

A generating operation 704 generates a block including the one or more validated transactions. An adding operation 706 adds the block to the distributed ledger. The adding operation 706 may include hashing the previous block's nonce into the current block such as to "chain" the blocks. A determining operation 708 determines whether the distributed ledger includes M additional blocks and the block is accepted by X trusted nodes. The values M and X may be selected based on the number of trusted nodes. For example, X may be a percentage (e.g., 75%) of the trusted nodes. The determination may be based on whether the X trusted nodes signed the added block. If the distributed ledger includes the M additional blocks and the block is accepted by X trusted nodes, a generating operation 710 generates a nonce for the block. The nonce may be generated using the hash of the previous block, the Merkle root of the transactions of the block, and the signatures of the stakeholder nodes. If the block is not verified (e.g., not accepted by X trusted nodes after M additional blocks), the process returns to the validating operation 702. In such a case, the block was generated by a different node and accepted by the X trusted parties after the M additional blocks.

Figure 8:
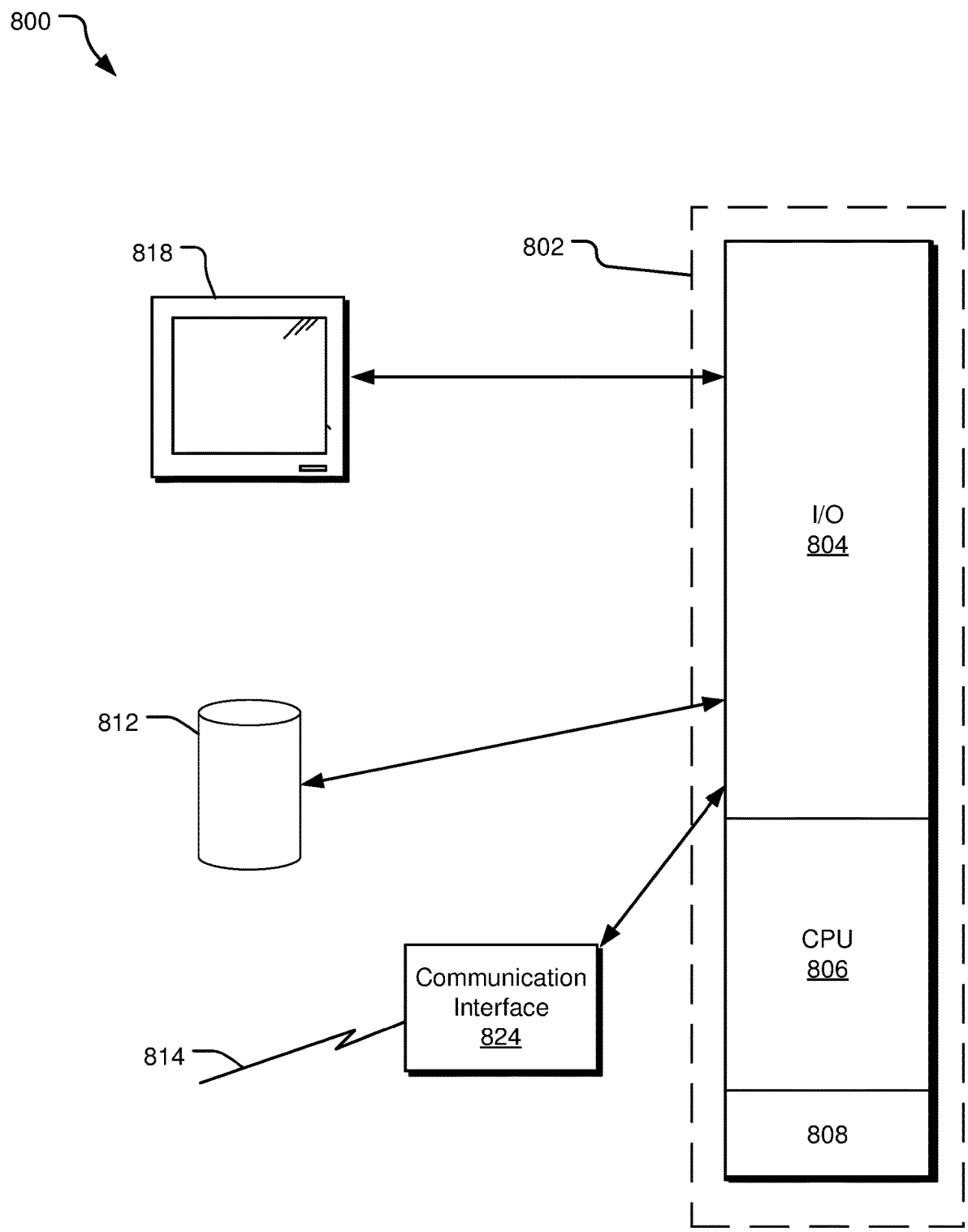
FIG. 8 illustrates an example processing system that may be useful in implementing the described technology

FIG. 8 illustrates an example processing system 800 that may be useful in implementing the described technology. The processing system 800 is capable of executing a computer program product embodied in a tangible computer-readable storage medium to execute a computer process. Data and program files may be input to the processing system 800, which reads the files and executes the programs therein using one or more processors (CPUs or GPUs). Some of the elements of a processing system 800 are shown in FIG. 8 wherein a processor 802 is shown having an input/output (I/O) section 804, a Central Processing Unit (CPU) 806, and a memory section 808. There may be one or more processors 802, such that the processor 802 of the processing system 800 comprises a single central-processing unit 806, or a plurality of processing units. The processors may be single core or multi-core processors. The processing system 800 may be a conventional computer, a distributed computer, or any other type of computer. The described technology is optionally implemented in software loaded in memory 808, a storage unit 812, and/or communicated via a wired or wireless network link 814 on a carrier signal (e.g., Ethernet, 3G wireless, 8G wireless, LTE (Long Term Evolution)) thereby transforming the processing system 800 in FIG. 8 to a special purpose machine for implementing the described operations. The processing system 800 may be an application specific processing system configured for supporting a distributed ledger. In other words, the processing system 800 may be a ledger node.

The I/O section 804 may be connected to one or more user-interface devices (e.g., a keyboard, a touch-screen display unit 818, etc.) or a storage unit 812. Computer program products containing mechanisms to effectuate the systems and methods in accordance with the described technology may reside in the memory section 808 or on the storage unit 812 of such a system 800.

A communication interface 824 is capable of connecting the processing system 800 to an enterprise network via the network link 814, through which the computer system can receive instructions and data embodied in a carrier wave. When used in a local area networking (LAN) environment, the processing system 800 is connected (by wired connection or wirelessly) to a local network through the communication interface 824, which is one type of communications device. When used in a wide-area-networking (WAN) environment, the processing system 800 typically includes a modem, a network adapter, or any other type of communications device for establishing communications over the wide area network. In a networked environment, program modules depicted relative to the processing system 800 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 808 and/or the storage unit 812 and executed by the processor 802. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 808 and/or the storage unit 812 and executed by the processor 802.

The processing system 800 may be implemented in a device, such as a user device, storage device, IoT device, a desktop, laptop, computing device. The processing system 800 may be a ledger node that executes in a user device or external to a user device.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
    Generating, using a user interface on a smart device, attestation information associated with a storage device, the attestation information representing a status of the storage device, and the attestation information including a video of an end-of-life physical destruction of the storage device and lifecycle information of the storage device comprising storage device transport, storage device activation, and storage device operational logs;
    transmitting an attestation transaction to a distributed ledger, the attestation transaction including the attestation information representing the status of the storage device, the attestation transaction providing a record of the status of the storage device accessible through the distributed ledger, and
    verifying a command transaction transmitted to the distributed ledger, the command transaction identifying the storage device and including command information for the storage device, command information used by the storage device to perform a command.

2. The method of claim 1, wherein the attestation information further comprising lifecycle information of the storage device, including storage device transport, storage device activation, and storage device operational logs.

3. The method of claim 1, wherein the attestation information includes backup information indicating that data stored on the storage device is replicated to a backup storage device.

4. The method of claim 2, wherein the lifecycle information of the storge device is generated using a user interface activated in response to scanning a QR code printed on the storage device or a package for the storage device.

5. The method of claim 1 wherein the video of an end-of-life destruction of the device is taken at the location of the end-of-life destruction of the storage device.

6. The method of claim 1 wherein the attestation information includes an indication that the storage device is locked.

7. The method of claim 1 wherein the attestation information includes internal digital characteristics of the storage device.

8. The method of claim 1 wherein the attestation transaction is generated using a user interface of a smart device.

9. One or more processor-readable storage device encoding processor-executable instructions for executing on a computer system a computer process, the computer process comprising:
    receiving a command transaction via a distributed ledger, the command transaction identifying a storage device and including command information for the storage device, command information used by the storage device to perform a command;

generating attestation information using a user interface on a smart device including a video of an end-of-life destruction of the storage device, the attestation information further comprising lifecycle information of the storage device, including storage device transport, storage device activation, and storage device operational logs; and transmitting the attestation transaction to a distributed ledger, the attestation transaction including the attestation information representing the status of the storage device, the attestation transaction providing a record of the status of the storage device accessible through the distributed ledger;

wherein the ledger node is further executable to support the distributed ledger by verifying the command transaction transmitted to the distributed ledger.

10. The one or more processor-readable storage media of claim 9 wherein the command the command information includes instructions to transmit an attestation transaction, the process further comprising:

transmitting the attestation transaction including the attestation information representing the status of the storage device.

11. The one or more processor-readable storage media of claim 9 wherein the command transaction includes a certificate for activating a capability of the storage device.

12. The one or more processor-readable storage media of claim 9 wherein the command transaction includes instructions for disabling the storage device.

13. The one or more processor-readable storage media of claim 9 wherein the command transaction includes a key for unlocking storage capacity on the storage device.

14. The one or more processor-readable storage media of claim 9 wherein the command transaction includes instructions to encrypt data stored on the storage device.

15. A system comprising:
one or more processors;
a memory; and
a ledger node stored in the memory and executable by the one or more processors to support a distributed ledger by verifying an attestation transaction transmitted to the distributed ledger, the attestation transaction identifying a storage device including attestation information representing a status of the storage device, the attestation transaction providing a record of the status of the storage device accessible through the distributed ledger, wherein the attestation information is generated using a user interface on a smart device and comprises a video of an end-of-life destruction of the storage device and lifecycle information of the storage device, including storage device transport, storage device activation, and storage device operational logs, wherein the ledger node is further executable to support the distributed ledger by verifying a command transaction transmitted to the distributed ledger, the command transaction identifying the storage device and including command information for the storage device, command information used by the storage device to perform a command to generate the attestation information.

16. The system of claim 15 wherein the ledger node is further executable to transmit a command transaction to the storage device, the command transaction identifying the storage device and including command information for the storage device, command information used by the storage device to perform a command.

17. The system of claim 15 wherein the ledger node further executable to transmit an attestation transaction to the distributed ledger, the attestation transaction generated on the storage device and including information attesting to internal digital characteristics of the storage device.

* * * * *